Patented Dec. 6, 1932

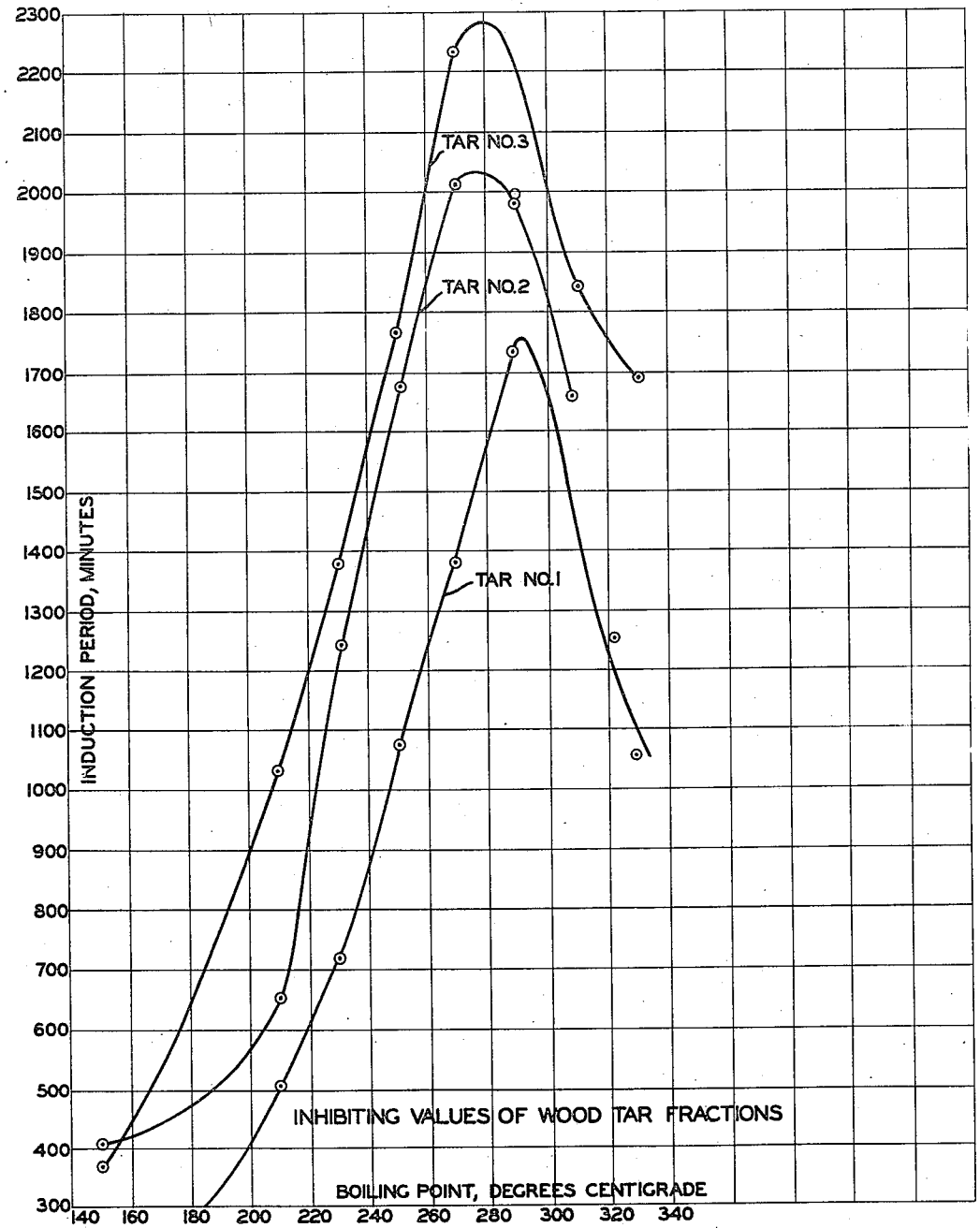

1,889,836

UNITED STATES PATENT OFFICE

CHARLES D. LOWRY, JR., AND CHARLES G. DRYER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

TREATMENT OF MOTOR FUEL

Application filed March 11, 1932. Serial No. 598,114.

This invention relates more particularly to the treatment of cracked distillates of gasoline boiling range or those containing a substantial proportion of gasoline, such distillates being generally characterized by a relatively high knock rating, whereby the deterioration thereof on storage, with respect to gum formation and particularly antiknock value, is substantially prevented, under the varying influence of light, air, etc., to which they are subjected.

Prior to the advent of the cracking process as a factor in the oil industry, the straight run gasoline produced either by simple distillation from crudes or by absorption from casing head gases were of an essentially saturated character, containing only negligible amounts of olefinic and cyclic hydrocarbons so that they underwent substantially no change when stored for long periods of time, particularly if reasonably protected from the influence of light and air.

Cracked gasolines which have now become an important factor in the trade contain relatively highly unsaturated olefinic constituents such as the di- and tri-olefins and are characterized by a tendency to deposit gummy or resinous materials upon standing, particularly under the influence of light and air. These constituents may be objectionable on account of this gum-forming tendency and also on account of their loss as possible antiknock material due to the gum-forming or polymerization reactions. During the gum-forming period in the storage of cracked gasoline a yellow to brown color frequently develops which is distinctly undesirable from a sales standpoint.

The present invention is directed to inhibiting the formation of these undesirable gums and coloring materials and the reduction in knock rating of the motor fuel although it is to be particularly pointed out that gum and color formation and reduction in antiknock value are not necessarily related and that the accomplishment of the two objects may not be brought about simultaneously, that is, they may be independent of each other.

Inhibitors are to be distinguished from antiknock agents in that the true antiknock agent modifies the combustion of fuel in an internal combustion engine cylinder but does not necessarily prevent the development of undesirable characteristics under storage. In fact, numerous well defined antiknock agents are themselves unstable in storage and the gasoline to which they are added needs further additions of true inhibitors to stabilize the increased antiknock value produced by the addition of the antiknock agent. Furthermore, it is usually necessary to use much higher percentages of reagents to prevent knocking than is necessary in inhibiting deterioration and depreciation of the gasoline so that it will be seen that in the great majority of cases the action of antiknock agents is distinct from that of true inhibitors the use of which constitutes the present invention.

In one specific embodiment the present invention comprises the use of selected distillate fractions produced in the distillation of hard wood tars as inhibitors to prevent the deterioration during storage of the desirable properties of cracked or other unstable gasolines.

We have found that fractions produced in the distillation of wood tars from hickory and oak woods are specially valuable as inhibitors. Such fractions are readily available and considerably cheaper than inhibitors at present used in the art which comprise for the main part individual chemical compounds which have been either segregated from naturally occurring tar distillates by tedious and expensive processes or synthesized by chemical processes no less difficult. The following tabulation shows the analysis of three particular hard wood tar fractions which we have employed and the results obtained by their use in a cracked gasoline ordinarily subject to rapid deterioration when stored for any length of time.

*Distillation of wood tar fractions*

| Sample No. | I | II | III |
|---|---|---|---|
| Specific Gravity ° | 1.0412 | 1.0599 | 1.0835 |
| | Distillation temperatures** | | |
| I. B. P. °F | 206* | 210* | 210° |
| 5% | 212* | 218* | 212* |
| 10 | 253 | 376 | 410 |
| 20 | 342 | 400 | 448 |
| 30 | 374 | 410 | 460 |
| 40 | 393 | 420 | 477 |
| 50 | 411 | 433 | 492 |
| 60 | 430 | 446 | 510 |
| 70 | 457 | 470 | 526 |
| 80 | 498 | 509 | 549 |
| 90 | 558 | 572 | 597 |
| 95 | 608 | 632 | 600 |
| E. P. | 623 | 638 | 620 |
| % @ 400° F | 35.0 | 14.0 | 3.0 |
| % @ 410° F | 40.5 | 24.0 | 4.0 |
| % @ 437° F | 55.0 | 47.0 | 10.0 |
| % @ 572° F | 82.5 | 84.0 | 80.0 |
| % Coke by weight | 0.5 | 1.2 | 1.8 |
| % Over | 99.0 | 99.0 | 98.0 |
| % Water approx | 7.0 | 6.0 | 6.0 |

*Oil and Water
**100 c. c.

*Inhibitor test data*

| Color | {0.01%<br>{0.05% | 30<br>27 | 30<br>28 | +30<br>30 |
|---|---|---|---|---|
| Induction period, min. | {0.01%<br>{0.05% | 300<br>570 | 420<br>1020 | 240<br>480 |

The three samples whose distillation and test data have just been given were further fractionated to produce cuts of narrowed boiling range, which were tested separately as to their effect upon the induction period of a finished Pennsylvania gasoline, the properties of which are given following the data on Sample 3. The table following shows actual experimental data obtained on Sample #1:

*Sample No. 1*

| Inhibitor | Percentage | Color° Saybolt | Color stability* | Induction period min. |
|---|---|---|---|---|
| Original oil fractions | | 25 | 24 | 570 |
| Initial–200° C | 36.6 | 30+ | 30+ | 180 |
| 200–220° C | 18.7 | 30+ | 30 | 510 |
| 220–240° C | 16.2 | 30 | 27 | 720 |
| 240–260° C | 7.8 | 28 | 24 | 1080 |
| 260–280° C | 7.7 | 26 | 22 | 1380 |
| 280–300° C | 7.6 | 24 | 20 | 1740 |
| 300–320° C | 3.4 | 16 | 16 | 1050 |
| 320– | 0.3 | –3 | –7 | 1260 |
| Blended fractions: | | | | |
| 220–260° C | 24.0 | 29 | 26 | 1380 |
| 240–280° C | 15.5 | 28 | 23 | 1815 |
| 260–300° C | 15.3 | 25 | 20 | 1965 |
| 280–320° C | 11.0 | 19 | 19 | 1800 |
| 220–280° C | 31.7 | 27 | 25 | 1440 |
| 220–300° C | 39.3 | 26 | 23 | 1665 |
| 220–320° C | 42.7 | 23 | 21 | 1590 |
| 240–300° C | 23.1 | 25 | 21 | 1815 |

It will be observed that the highest figure for the induction period corresponded to a 260–300° C. blended fraction and that the next highest figures were obtained on 240–280° C. and 240–300° C. blended fractions. These figures are considerably in excess of requirements and the amount of tar fraction used was 1/20 of 1%, which reduced the color of the gasoline to an undesirable extent. Sufficiently high induction periods were obtained using 1/100 of 1% of these fractions without materially affecting the color of the gasoline.

The following tabulations show results of similar tests on Samples #2 and #3.

*Sample No. 2*

| Inhibitor | Percentage | Color° Saybolt | Color stability* | Induction period min. |
|---|---|---|---|---|
| Original oil fractions | | 26 | 22 | 1020 |
| Initial–200° C | 12.0 | 30+ | 30 | 405 |
| 200–220° C | 30.8 | 30+ | 30 | 660 |
| 220–240° C | 22.4 | 30+ | 29 | 1245 |
| 240–260° C | 10.8 | 30+ | 25 | 1680 |
| 260–280° C | 9.6 | 29 | 23 | 2010 |
| 280–300° C | 6.8 | 27 | 21 | 1980 |
| 300–315° C | 3.2 | 15 | 13 | 1665 |
| Blended fractions: | | | | |
| 220–260° C | 33.2 | 30 | 28 | 1050 |
| 240–280° C | 20.4 | 29 | 23 | 1680 |
| 260–300° C | 16.4 | 26 | 23 | 1875 |
| 280–315° C | 10.0 | 19 | 17 | 1770 |
| 220–280° C | 42.8 | 27 | 23 | 1380 |
| 220–300° C | 49.6 | 28 | 23 | 1290 |
| 220–315° C | 52.8 | 27 | 22 | 1440 |
| 240–300° C | 27.2 | 28 | 23 | 1890 |

*Sample No. 3*

| Inhibitor | Percentage | Color° Saybolt | Color stability* | Induction period min. |
|---|---|---|---|---|
| Original oil fractions | | 24 | 22 | 1470 |
| Initial–200° C | 7.0 | 16 | 16 | 375 |
| 200–220° C | 3.6 | 26 | 24 | 1035 |
| 220–240° C | 18.5 | 27 | 24 | 1380 |
| 240–260° C | 25.9 | 27 | 24 | 1770 |
| 260–280° C | 23.0 | 28 | 23 | 2235 |
| 280–300° C | 13.8 | 21 | 19 | 1995 |
| 300–320° C | 3.7 | 17 | 16 | 1845 |
| 320– | 3.0 | 4 | 0 | 1695 |
| Blended fractions | | | | |
| 200–240° C | 22.1 | 27 | 24 | 1605 |
| 220–260° C | 44.4 | 27 | 26 | **2295 |
| 240–280° C | 48.9 | 30 | 24 | **2475 |
| 260–300° C | 36.8 | 24 | 21 | 2310 |
| 280–320° C | 17.5 | 20 | 17 | **2115 |
| 300– | 6.7 | 13 | 13 | 1665 |
| 200–260° C | 48.0 | 29 | 25 | 1755 |
| 200–280° C | 69.0 | 29 | 23 | 1980 |
| 200–300° C | 84.8 | 28 | 23 | 1770 |
| 200–320° C | 88.5 | 28 | 23 | 1890 |
| 200– | 91.1 | 26 | 21 | 2100 |
| 220–280° C | 67.4 | 28 | 21 | 1920 |
| 220–300° C | 81.2 | 27 | 21 | 1890 |
| 240–300° C | 62.7 | 26 | 21 | 2115 |

Pennsylvania finished gasoline used in these tests.
Color °Saybolt ___ 30+  Gr. A. P. I ___ 60.0
Color stability* ___ 30+  End point °F ___ 410
Induction period, min ___ 50
* Equivalent to two hours noon June sunlight.
** Slow pressure drop.

The drawing shows graphically the relationships between the induction periods and the boiling ranges, and indicates that for each sample a maximum was reached corresponding roughly to a boiling point of 280° C.

The reasons for this observed result are not obvious since the basic reason for the inhibiting value of the crude tar fractions may depend to a large extent upon their complex chemical nature, which is difficult of exact determination. However, the experimental results are definite and show that fractions of variable inhibiting value may be obtained which, when used in proper quantity, do not affect the color or the color stability of the gasoline to which they are added.

It is probable that the inhibiting efficiency of the wood tar fractions is due to their complex chemical composition, and possibly to the presence of separate compounds whose exact chemical nature is extremely difficult, if not impossible, of determination. The inhibiting values shown have been found to be higher as measured by the induction period determined in the oxygen bomb test than many chemical compounds used as inhibitors whose boiling points lie within the ranges shown in the tabulation, this being probably due to the presence of bodies of complex composition and possibly to mixtures of compounds whose inhibiting efficiency is greater than the individual components of the mixture.

The oxygen bomb test above referred to is now generally accepted as a method of measuring the stability of gasolines on storage and consists in subjecting the gasolines under controlled conditions of temperature and pressure to the action of gaseous oxygen, the induction period being the time which elapses before measurable reduction in pressure occurs due to oxygen absorption. This test has been found to give results from which the relative stability of different gasolines on storage may be predicted and a four-hour induction period has been arbitrarily adopted as the minimum time for a sufficiently stable gasoline under the average set of conditions. It will be observed from the test data given that the wood tar fractions whose use constitutes the present invention gave figures equal to or greater than this figure even when used in amounts as low as 0.01%, the color of the gasoline being substantially unaffected by such small additions of inhibiting material. Even when 0.05% was used, the color was but slightly affected while the stability was markedly increased in all cases. The gasoline utilized in the test results of which are shown above, was produced by the cracking of a highly paraffinic fuel oil from the Pennsylvania field under approximately 300 pounds per square inch pressure and a maximum cracking temperature of 945° F.

The selection of a wood tar fraction for use in preventing the deterioration of any given gasoline on storage will be determined by consideration of a large number of factors. Primarily the chemical composition of cracked and straight run gasolines from different sources will vary markedly in respect to the percentages of those classes of compounds which require stabilization by the use of inhibitors. For example, when cracked gasolines are produced under relatively high temperatures and low superatmospheric pressures by processes currently known as "vapor phase" cracking processes, the percentages of di- and tri-olefins may be relatively high resulting in a pronounced tendency toward polymerization with attendant depreciation in value of the gasoline stock. In such cases more highly efficient wood tar fractions may be used, and percentages of the order of from possibly 0.01 to 0.05%. When more nearly saturated gasolines are produced from intermediate petroleum distillates of a relatively saturated character and under higher superatmospheric pressure and lower temperatures, either small amounts of the more efficient fractions or the same amounts of relatively less efficient may suffice to effect the required stabilization of properties. In most cases the proper selection will be readily made by a few experiments and present no unusual difficulties.

The foregoing specification and examples have disclosed the nature of the present invention but neither should be considered in the light of embodying limitations thereon since it is evidently broad in scope and applicable in many other cases than the one given.

We claim as our invention:

1. A process for preventing or substantially reducing deterioration of hydrocarbon distillates consisting essentially of gasoline and containing cracked unsaturated hydrocarbons, said process comprising adding to the distillate a small amount of an oily distillate of hardwood tar, boiling between 240° C. and 300° C.

2. A process for preventing or substantially reducing deterioration of hydrocarbon distillates consisting essentially of gasoline and containing cracked unsaturated hydrocarbons, said process comprising adding to the distillate a small amount of an oily distillate of hardwood tar, boiling between 240° C. and 280° C.

3. A process for preventing or substantially reducing deterioration of hydrocarbon distillates consisting essentially of gasoline and containing cracked unsaturated hydrocarbons, said process comprising adding to the distillate between .01% and .05% of an oily distillate of hardwood tar boiling between 240° C. and 280° C.

4. Motor fuel comprising cracked gasoline containing a small amount of an oily distillate of hardwood tar boiling between 240° C. and 300° C.

5. Motor fuel comprising cracked gasoline containing a small amount of an oily distillate of hardwood tar boiling between 240° C. and 280° C.

6. Motor fuel comprising cracked gasoline containing between .01% and .05% of an oily distillate of hardwood tar boiling between 240° C. and 280° C.

CHARLES D. LOWRY, Jr.
CHARLES G. DRYER.